US010643547B2

(12) United States Patent
Naitou

(10) Patent No.: US 10,643,547 B2
(45) Date of Patent: May 5, 2020

(54) PROJECTOR AND METHOD OF SWITCHING ELECTRIC POWER OF LIGHT SOURCE

(71) Applicant: NEC Display Solutions, Ltd., Tokyo (JP)

(72) Inventor: Michitaka Naitou, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/065,044

(22) PCT Filed: Jan. 20, 2016

(86) PCT No.: PCT/JP2016/051507
§ 371 (c)(1),
(2) Date: Jun. 21, 2018

(87) PCT Pub. No.: WO2017/126042
PCT Pub. Date: Jul. 27, 2017

(65) Prior Publication Data
US 2019/0005893 A1 Jan. 3, 2019

(51) Int. Cl.
*G09G 3/34* (2006.01)
*H04N 9/31* (2006.01)
*G03B 21/20* (2006.01)

(52) U.S. Cl.
CPC ....... *G09G 3/3406* (2013.01); *G03B 21/2053* (2013.01); *H04N 9/3144* (2013.01);
(Continued)

(58) Field of Classification Search
CPC ......... G09G 3/3406; G09G 2320/0247; G09G 2320/0633; G09G 2330/021;
(Continued)

(56) References Cited

U.S. PATENT DOCUMENTS 8,960,926 B2 * 2/2015 Kobayashi ............... G03B 9/06
353/85
9,086,614 B2 * 7/2015 Shioya ............... G03B 21/2053
(Continued)

FOREIGN PATENT DOCUMENTS

JP 2003-295320 A 10/2003
JP 2004-207018 A 7/2004
(Continued)

OTHER PUBLICATIONS

English Translation of JP 2015-225235, dated Dec. 14, 2015.*
International Search Report (ISR) (PCT Form PCT/ISA/210), in PCT/JP2016/051507, dated Apr. 5, 2016.

*Primary Examiner* — Patrick N Edouard
*Assistant Examiner* — Eboni N Giles
(74) *Attorney, Agent, or Firm* — McGinn I. P. Law Group, PLLC.

(57) ABSTRACT

Transition to an electric power saving mode is performed without giving a user of a projector the false awareness that the projector is failing, a flicker phenomenon is suppressed and an image with a brightness in the electric power saving mode being is immediately projected, first to third electric powers electric power values which become smaller in this order are used as light source electric power, and a controller that, upon acceptance of an input for selecting the third electric power, causes the second electric power to be supplied to the light source and decreases an amplitude of the image signal, and after elapse of a fixed time, causes the third electric power to be supplied to the light source is included.

15 Claims, 6 Drawing Sheets

(52) U.S. Cl.
CPC ......... *H04N 9/3155* (2013.01); *H04N 9/3182* (2013.01); *G09G 2320/0247* (2013.01); *G09G 2320/0633* (2013.01); *G09G 2330/021* (2013.01)

(58) Field of Classification Search
CPC ............. G03B 21/2053; H04N 9/3144; H04N 9/3155; H04N 9/3182
See application file for complete search history.

(56) References Cited

U.S. PATENT DOCUMENTS

| | | | | |
|---|---|---|---|---|
| 2004/0136134 A1* | 7/2004 | Okawa | ................. | H05B 41/288 361/93.1 |
| 2013/0083090 A1* | 4/2013 | Yamauchi | .............. | G09G 3/002 345/690 |
| 2016/0142576 A1* | 5/2016 | Yamaguchi | ........ | H04N 1/00891 358/1.13 |
| 2016/0195916 A1* | 7/2016 | Shiozaki | ............... | G06F 1/3265 348/333.13 |

FOREIGN PATENT DOCUMENTS

| | | |
|---|---|---|
| JP | 2010-129341 A | 6/2010 |
| JP | 2013-201030 A | 10/2013 |
| JP | 2015-225235 A | 12/2016 |
| WO | WO 2012/029172 A1 | 3/2012 |

\* cited by examiner

FIG. 2

| NAME DEFINITION | RATE OF ELECTRIC POWER VALUE [%] (APPROXIMATE VALUE) | NAME DEFINITION IN THIS PROPOSAL (ECO Mode SETTING) | APPROXIMATE ROTATIONAL SPEED OF COOLING (FAN) |
|---|---|---|---|
| RATED ELECTRIC POWER | 100 | ECO OFF | HIGH SPEED |
| DIMMING ELECTRIC POWER | 80 | ECO1 | MEDIUM SPEED |
| SAVING ELECTRIC POWER | 60 | ECO2 | LOW SPEED |

PROJECTOR AND METHOD OF SWITCHING ELECTRIC POWER OF LIGHT SOURCE

FIELD OF THE INVENTION

The present invention relates to a projector using a light source whose luminance changes in accordance with supplied electric power, and a method of switching electric power of a light source.

BACKGROUND OF THE INVENTION

Projectors are being used in various environments such as meeting rooms, class rooms, households, and outdoors due to their continuous downsizing and high functionality. Environments in which projectors are used often differ as regards the surrounding brightness. Projectors are recently required to be able to project an image whose brightness is suitable for such environments in which the projectors are used. In order to realize such a projector, there is sometimes used a light source whose luminance changes in accordance with supplied electric power.

In a projector using a light source whose luminance changes in accordance with supplied electric power, the brightness of the light source is controlled in general by changing the electric power supplied to the light source within a predetermined range of the rated electric power determined for the light source, for example, from approximately 80% to 60% of the rated electric power in view of control of the brightness and electric power saving (see Patent Literature 1). In the following description, 80% of the rated electric power is described as dimming electric power, and electric power of 60% or less of the rated electric power as saving electric power.

DESCRIPTION OF RELATED ART

Patent Literature

Patent Literature 1: JP2010-129341A

SUMMARY OF THE INVENTION

Technical Problem

It is known that in the case where a saving electric power is supplied to a light source, a flicker phenomenon significantly arises when the difference between the electric power supplied to the light source immediately before the suppling the saving electric power and the saving electric power is large. It is also known that a flicker phenomenon can be suppressed by the elapse of a fixed time in the state where the difference in electric power value is small. Therefore, when a user of a projector performs operation of switching from the state where the rated electric power or the dimming electric power is supplied to the light source to an electric power saving mode of supplying the saving electric power, in order to securely suppress a flicker phenomenon, it is desirable to supply, after supplying the dimming electric power for a fixed time, the saving electric power.

However, in the case of performing the control operation, as described above, since the brightness of an image results from the dimming electric power for the fixed time after the operation, this results in the image being brighter than that of the image for which the saving electric power is supplied. Therefore, this is time consuming until the image with the brightness that is intended by the user of the projector is projected, and gives the user of the projector the false awareness that the projector is failing.

The present invention realizes a projector and a method of switching electric power of a light source with which transition to an electric power saving mode is performed without giving a user of the projector the false awareness that the projector is failing, a flicker phenomenon being suppressed and an image with a brightness in the electric power saving mode being capable of being immediately projected.

Solution to Problem

There is provided a projector according to the present invention for projecting an image displayed by an image signal, the projector including:

a light source for generating said image, said light source being supplied with any of the first to third electric powers whose electric power value becomes smaller in the order of the first to third electric powers, said light source having a luminance that becomes brighter as a supplied electric power value becomes larger;

a switching input section that accepts an input for selecting any of said first to third electric powers; and a controller that, upon acceptance of an input for selecting said third electric power by said switching input section, causes said second electric power to be supplied to said light source and decreases an amplitude of said image signal, and after elapse of a fixed time, causes said third electric power to be supplied to the light source and increases an amplitude of said image signal.

There is provided a method of switching electric power of a light source according to the present invention, said method being performed in a projector for projecting an image displayed by an image signal, said projector including: said light source for generating said image, said light source being supplied with any of the first to third electric powers whose electric power value becomes smaller in the order of the first to third electric powers, said light source having a luminance that becomes brighter as a supplied electric power value becomes larger; and a switching input section that accepts an input for selecting any of said first to third electric powers, the method wherein upon acceptance of an input for selecting said third electric power by said switching input section, causing said second electric power to be supplied to said light source and decreasing an amplitude of said image signal, and after elapse of a fixed time, causing said third electric power to be supplied to said light source and increasing an amplitude of said image signal.

Advantageous Effects of Invention

The present invention including the aforementioned configuration can perform transition to an electric power saving mode with the third electric power without giving the user of the projector the false awareness that the projector is failing, a flicker phenomenon being suppressed and immediately projecting an image that has the brightness of the electric power saving mode.

BRIEF DESCRIPTION OF DRAWINGS

FIG. 2 is a diagram showing performances and name definitions of a halogen lamp used as a light source of light source section 1 shown in FIG. 1.

DESCRIPTION OF THE PREFERRED EMBODIMENTS

Next, exemplary embodiments of the present invention are described with reference to the drawings.

First Exemplary Embodiment

Figure 1:
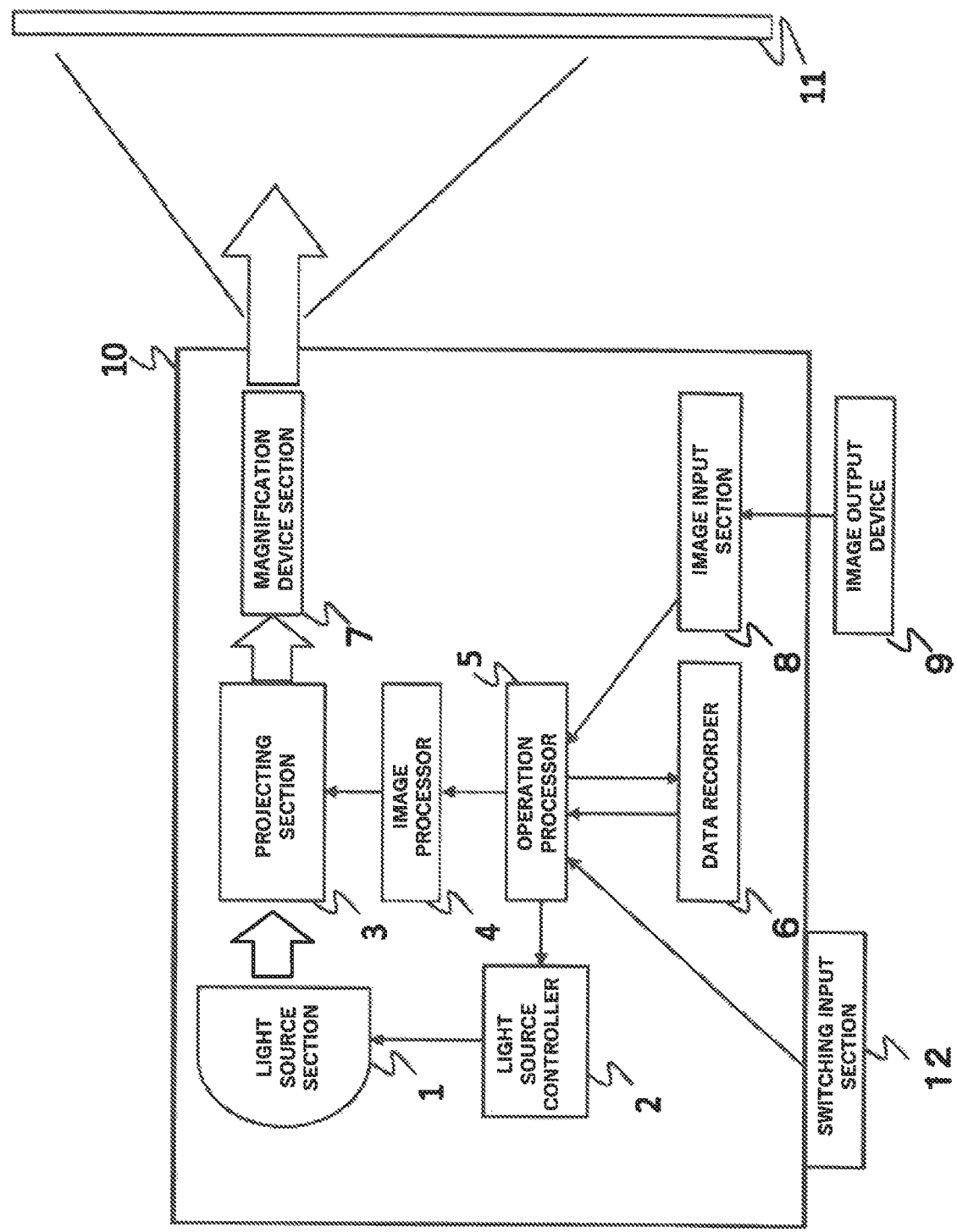
FIG. 1 is a block diagram showing a configuration of a first exemplary embodiment of a projector according to the present invention.

FIG. 1 is a block diagram showing a configuration of a first exemplary embodiment of a projector according to the present invention.

Projector 10 of the present exemplary embodiment consists of light source section 1, light source controller 2, projecting section 3, image processor 4, operation processor 5, data recorder 6, magnification device section 7, image input section 8 and switching input section 12, and projects an image displayed by an image signal provided by image output device 9 to screen 11.

Light source section 1 outputs various color lights simultaneously or in parallel using a light source whose luminance changes in accordance with supplied electric power. While various types of light sources are applicable, an extra-high pressure mercury lamp is used in the present exemplary embodiment.

Light source controller 2 controls the luminance of light source section 1 by controlling the increase and decrease of electric power of light source section 1.

Projecting section 3 is a spatial light modulator for generating image light, and a liquid crystal panel, a DMD (Digital Mirror Device), or an LCOS (Liquid Crystal on Silicon) can be used. The DMD is used in the present exemplary embodiment.

Image processor 4 processes image amplitude adjustment (brightness and contrast), ON/OFF of image mute, and the like on an image signal which is output from image output device 9 and input via image input section 8 and operation processor 5.

Operation processor (CPU: Central Processor Unit) 5 as a controller is connected to light source controller 2, image processor 4, data recorder 6 and switching input section 12, and controls basic operation of projector 10 by controlling light source controller 2 and image processor 4 in accordance with the image signal input from image input section 8, contents recorded in data recorder 6, and a switching signal input from switching input section 12.

Data recorder 6 records a standby time used for control by operation processor 5.

Magnification device section 7 is a magnification optical system configured by using an optical lens, and magnifies the image light generated by projecting section 3 to project it toward the outside of projector 10.

Image input section 8 accepts the image signal from image output device 9, includes an RGB terminal, an HDMI (High-Definition Multimedia Interface) terminal and the like, and accepts the image signal via each terminal depending on the type of the image signal to be accepted.

Switching input section 12 accepts a switching input for changing the luminance of light source section 1 from a user of projector 10, and sends the accepted switching signal to operation processor 5.

Image output device 9 outputs the image signal, and as an actual device, a personal computer (PC), a DVD player or the like can be cited.

FIG. 2 shows performances and name definitions of an extra-high pressure mercury lamp used as the light source of light source section 1 in the present exemplary embodiment.

Modes of electric power supplied to the extra-high pressure mercury lamp have three states of the rated electric power (ECO OFF) as a first electric power, a dimming electric power (ECO1) as a second electric power, and a saving electric power (ECO2) as a third electric power. As to the luminance of the light source, the luminance is modulated in accordance with a rate of an electric power value. Moreover, these states are switchable. Moreover, in light source section 1, a fan (not shown) for cooling the extra-high pressure mercury lamp is provided, and the rotational speed of the fan indicating cooling performance is also varied in accordance with the supplied electric power.

Next, a control operation of the present exemplary embodiment is described with reference to flowcharts in FIG. 3 and FIG. 4. As a premise, the following description is focused on control performed during the light source of light source section 1 of projector 10 being turned on.

Figure 3:
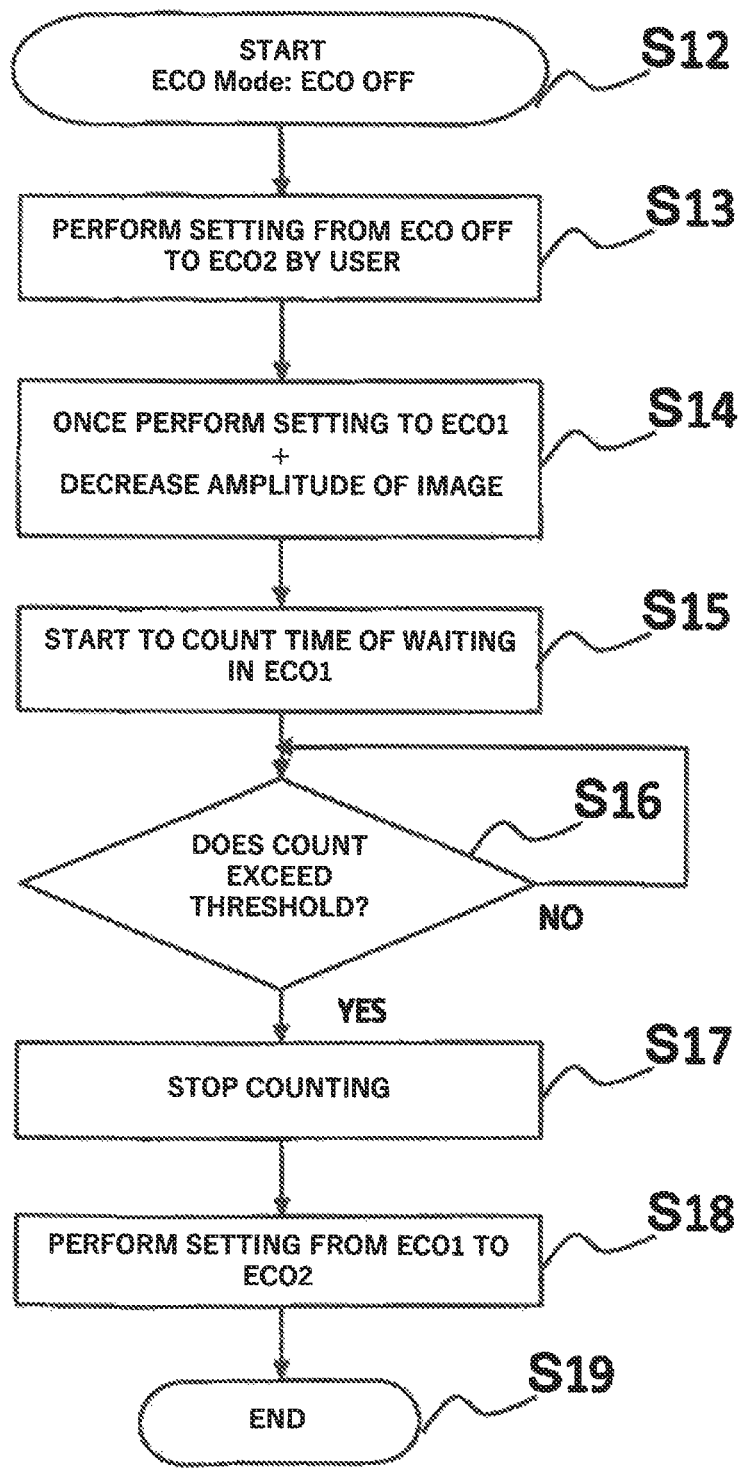
FIG. 3 is a flowchart showing control performed in the first exemplary embodiment of the present invention.

The flowchart in FIG. 3 shows processing in the case where the user of projector 10 switches from the state of the rated electric power (hereafter, ECO OFF) to the saving electric power (hereafter, ECO2). The flowchart in FIG. 4 shows processing in the case where the user of projector 10 switches from the state of the dimming electric power (hereafter, ECO1) to ECO2. The difference between the flowchart in FIG. 3 and the flowchart in FIG. 4 is in that the flowchart shown in FIG. 3 includes a process of switching to ECO1 and that the flowchart shown in FIG. 4 perform only a process of decreasing the amplitude of the image without switching to ECO1 due to having already been in the ECO1 state.

First, control shown in the flowchart of FIG. 3 is described.

At the start, the ECO Mode is set to be ECO OFF (step S12). After that, when the user of projector 10 changes an operation input of switching from ECO OFF to ECO2 to switching input section 12 (step S13), operation processor 5 does not immediately switch to ECO2 but first switches to ECO1 and decreases the amplitude of the image (contrast) by image processor 4 (step S14). In this time, the amplitude of the image is decreased such that the projected picture image becomes darker than in ECO1. Thereby, the user of the projector can recognize the switching to ECO2, and does not get the mistaken awareness that the projector may fail. Otherwise, by the process of decreasing the amplitude of the image in step S14, the brightness of the projected image may be made the same brightness as that in ECO2 which is decreased less than the brightness in ECO1. In other words, regardless of the state of ECO1, the amplitude of the image may be determined so as to be substantially the same brightness as that in ECO2. Thereby it is more preferable since the user of the projector can definitely recognize the switching from ECO OFF to ECO2.

Next, operation processor 5 starts to count in order to perform time monitoring for whether ECO1 is changed to ECO2 (step S15), and checks whether the count value exceeds a predetermined threshold (step S16).

When the count value exceeds the threshold and it is confirmed that a fixed time has elapsed from the start of counting, operation processor 5 stops counting (step S17), switches the electric power supplied to the light source from ECO1 to ECO2, increases the amplitude of the image, sets it to the original amplitude (step S18), and ends the processing (step S19).

Here, the threshold for counting used in step S16 is acquired from data recorder 6. Empirically, the threshold converted to time is needed to be at least approximately 30 seconds with respect to the light source in which flicker arises, and also in the present exemplary embodiment, the threshold corresponding to 30 seconds or more in time is used.

By performing the control as above, when the user of projector 10 changes an operation input of switching from ECO OFF to ECO2 to switching input section 12, the flicker phenomenon is suppressed and the image having the brightness in the electric power saving mode is immediately projected. Hence, the user of the projector does not get the mistaken awareness that the projector may fail.

Figure 4:
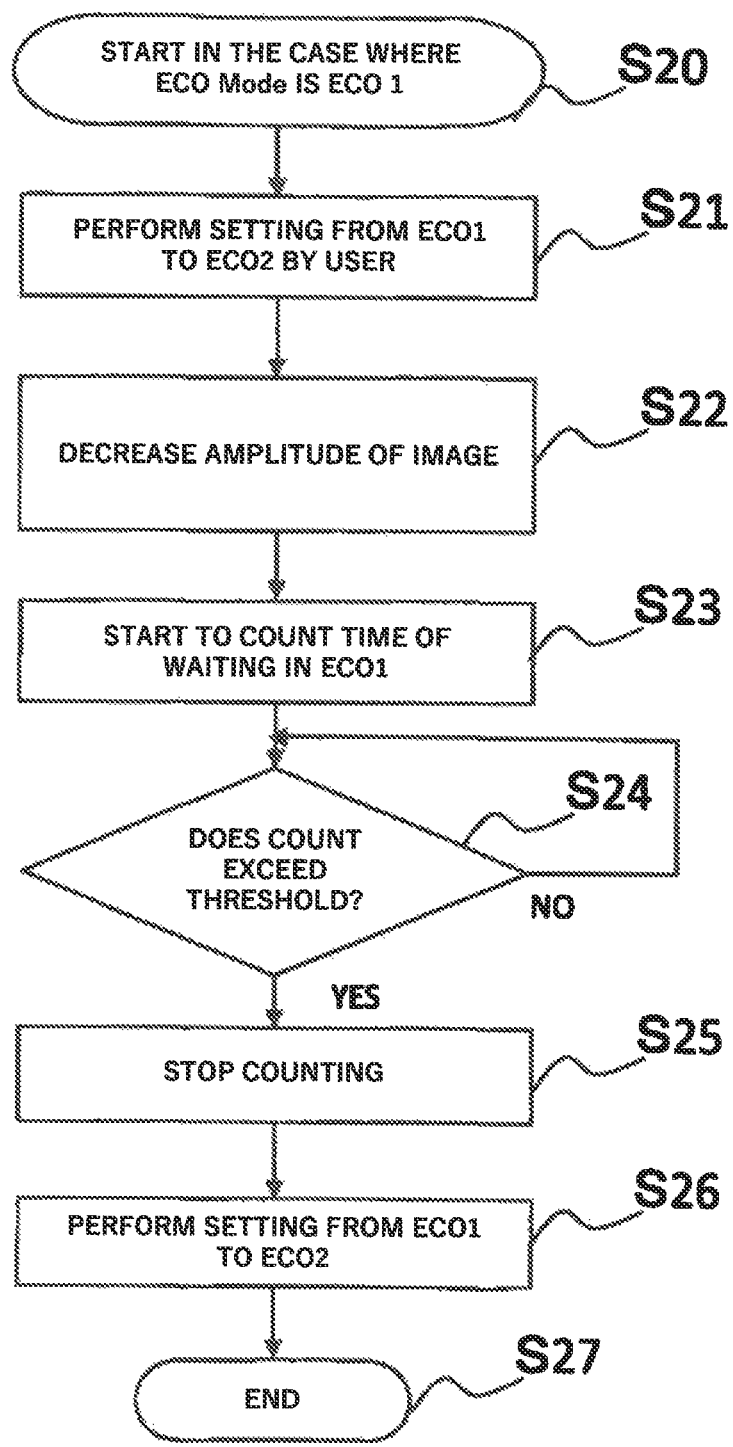
FIG. 4 is a flowchart showing control performed in the first exemplary embodiment of the present invention.

Next, control shown in the flowchart of FIG. 4 is described.

While the flowchart shown in FIG. 3 shows performance of a control operation in the case where the initial state is ECO OFF, the flowchart shown in FIG. 4 shows control performed when the initial state is ECO1 (step S20). Therefore, even where the user of projector 10 changes an operation input of switching from ECO1 to ECO2 to switching input section 12 (step S21), in the succeeding step S22, only the decreasing of the amplitude of the image (contrast) is done. In this time, the amplitude of the image is decreased such that the projected picture image becomes darker than in ECO1. Thereby, the user of the projector can recognize the switching to ECO2, and does not get the mistaken awareness that the projector may fail. Otherwise, by the process of decreasing the amplitude of the image in step S22, the brightness of the projected image may be made the same brightness as that in ECO2 which is decreased less than the brightness in ECO1. In other words, the amplitude of the image may be determined so as to be substantially the same brightness as that in ECO2. Thereby it is more preferable that the user of the projector can thus definitely recognize the switching from ECO1 to ECO2.

Operation from step S23 to step S27 after step S22 is similar to the operation from step S15 to step S19 shown in FIG. 3.

Second Exemplary Embodiment

Next, the second exemplary embodiment of present invention is described. A device configuration of the present exemplary embodiment is similar to that of the first exemplary embodiment shown in FIG. 1, and only control performed by operation processor 5 is different between those. Therefore, the control operation of the present exemplary embodiment is described with reference to flowcharts in FIG. 5 and FIG. 6.

Figure 5:
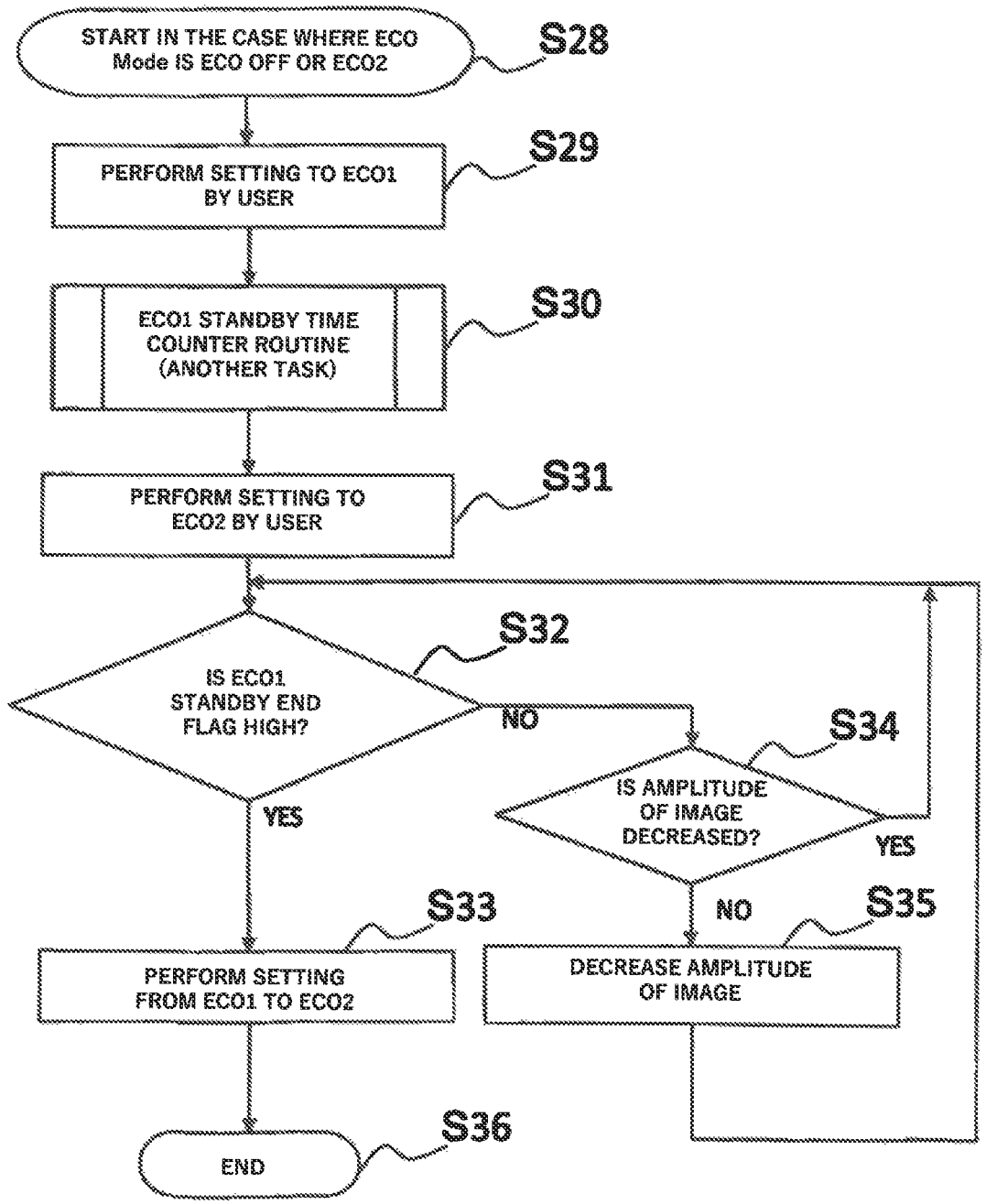
FIG. 5 is a flowchart showing control performed in a second exemplary embodiment of the present invention.

First, a control operation shown in the flowchart of FIG. 5 is described.

The operations of the flowchart shown in FIG. 5 are performed in the case where the initial state is ECO OFF or ECO2 (step S28). When the user of projector 10 changes an operation input of switching from ECO OFF or ECO2 to ECO1 to switching input section 12 (step S29), operation processor 5 performs setting to the ECO1 state, and processes, as another task, counter processing to check whether the state of ECO1 has elapsed for a fixed time (step S30). This time of maintaining the state of ECO1 for the fixed time is called an ECO1 standby time. Moreover, since step S30 is processed in the other task, the processing is put forward to step S31 without waiting for the end of step S30.

Figure 6:
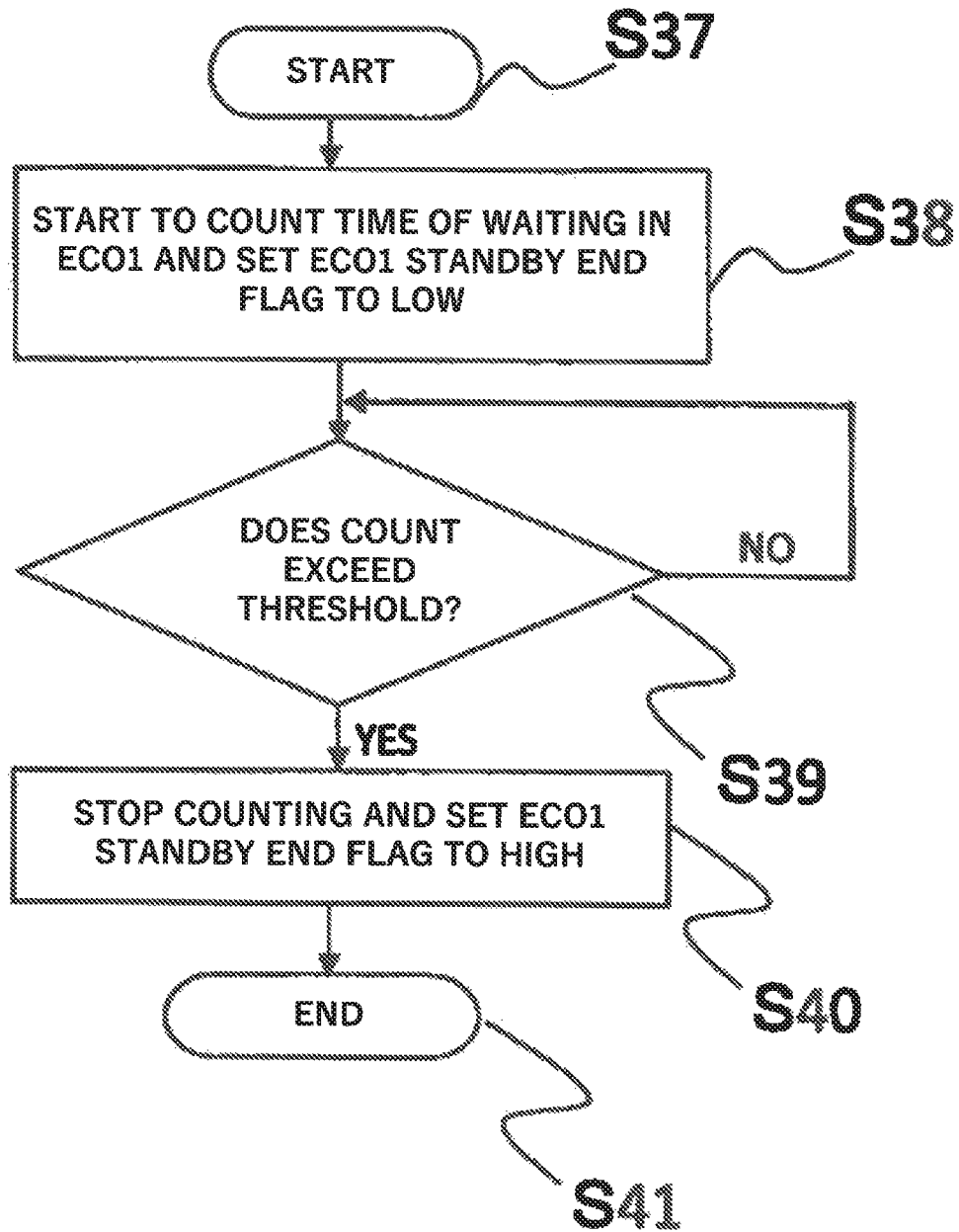
FIG. 6 is a flowchart showing control performed in the second exemplary embodiment of the present invention.

FIG. 6 is a flowchart showing processing of the other task performed in step S30.

When the other task is started (step S37), operation processor 5 sets an ECO1 standby end flag provided in the data recorder to be Low and starts to count (step S37), and checks whether the counted value exceeds a threshold (step S39). The threshold used here is the same as the threshold used in step S16 shown in FIG. 3, and is acquired from data recorder 6.

When it is confirmed that the counted value exceeds the threshold in step S39, the counting is stopped and the ECO1 standby end flag is set to be High (step S40), and the processing is ended (step S41).

Returning to the flowchart in FIG. 5 again, when, after setting the ECO1 state in step S30, the user of projector 10 changes an operation input of switching to ECO2 to switching input section 12 (step S32), operation processor 5 checks the state of the ECO1 standby end flag (step S32).

When it is confirmed in step S32 that the ECO1 standby end flag is High, operation processor 5 sets the ECO2 state, increases the amplitude of the image and sets it to the original amplitude (step S33), and next, ends the processing (step S36).

When it is confirmed in step S32 that the ECO1 standby end flag is Low, operation processor 5 checks whether the amplitude of the image is decreased by image processor 4 (step S34), and when the amplitude of the image is not decreased, decreases the amplitude of the image (step S35), and the processing is returned to step S32.

In step S35, the amplitude of the picture image is decreased such that the projected image becomes darker than in ECO1. Thereby, the user of the projector can recognize the switching to ECO2, and does not get the mistaken awareness that the projector may fail. Otherwise, by the process of decreasing the amplitude of the image in step S35, the brightness of the projected image may be made the same brightness as that in ECO2 which is decreased less than the brightness in ECO1. In other words, the amplitude of the image may be determined so as to be substantially the same brightness as that in ECO2. Thereby it is more preferable since the user of the projector can definitely recognize the switching from ECO1 to ECO2.

When it is confirmed in step S34 that the amplitude of the image is decreased, the processing is directly returned to step S32. Thus, decreasing the amplitude of the image is done only once.

Here is indicated the relation between the time (ECO1 standby time) required from step S37 to step S41 and the time (time of decreasing the amplitude of the image) of returning to step S32 via step S34 or step 35 from step S32.

Switching from ECO1 to ECO2 is not performed until the elapse of the ECO1 standby time. Therefore, when the user of the projector changes an operation input of switching to ECO2 during the ECO1 standby time, it is necessary that the amplitude of the image be decreased and that the brightness of the picture image that is to be projected be decreased. In other words, the time of decreasing the amplitude of the image is shorter than the ECO1 standby time. By doing so, when switching from ECO1 to ECO2, the amplitude of the image can be surely decreased and decrease the brightness of the picture image to be projected can be decreased even during the ECO1 standby time. Therefore, the user of the projector can recognize the switching to ECO2, and does not get the mistaken awareness that the projector may fail.

In the present exemplary embodiment of performing the aforementioned control, when the ECO1 state in which a flicker phenomenon does not arise has elapsed for a fixed time, transition to ECO2, which is the electric power saving mode, is immediately made, and hence, electric power saving can be further achieved in addition to the advantageous effect of the first exemplary embodiment.

Notably, while in the description above, 80% of the rated electric power is described as the dimming electric power and 60% of the rated electric power as the saving electric power, these rates are not limited to the above. An approximate saving electric power corresponds to a rate at which a flicker phenomenon arises in switching from the rated electric power, and thus, it may be 20% of the rated electric power. At an approximate dimming electric power, a flicker phenomenon does not arise when, after supply to the light source continues for a fixed time, switching to the saving electric power is performed.

REFERENCE SIGNS LIST

1 Light source section
2 Light source controller
3 Projecting section
4 Image processor
5 Operation processor
6 Data recorder
7 Magnification device section
8 Image input section
9 Image output device
10 Projector
11 Screen
12 Switching input section

The invention claimed is:

1. A projector for projecting an image displayed by an image signal, the projector comprising:
 a light source for generating said image, said light source being supplied with any of first to third electric powers whose electric power value becomes smaller in an order of the first to third electric powers, said light source having a luminance that becomes brighter as a supplied electric power value becomes larger;
 a switching input section that accepts an input for selecting any of said first to third electric powers; and
 a controller that, after acceptance of an input for selecting the first electric power or the second electric power by said switching input section, then upon acceptance of an input for selecting said third electric power by said switching input section, when said second electric power has been supplied to said light source for a fixed time causes said third electric power to be supplied to said light source, and, when said second electric power is not supplied to said light source for the fixed time, causes the second electric power to be supplied to said light source and decreases an amplitude of said image signal and after an elapse of a fixed time causes the third electric power to be supplied to said light source,
 wherein, after the acceptance of the input for selecting the second electric power by said switching input section, then upon the acceptance of the input for selecting said third electric power by said switching input section, when said second electric power has been supplied to said light source for the fixed time, the controller causes said third electric power to be supplied to said light source, and, when said second electric power is not supplied to said light source for the fixed time, the controller causes the second electric power to be supplied to said light source and decreases the amplitude of said image signal, and after the elapse of the fixed time, the controller causes the third electric power to be supplied to said light source.

2. The projector according to claim 1, wherein, when causing the third electric power to be supplied to said light source after the elapse of said fixed time, said controller increases the amplitude of the image signal.

3. The projector according to claim 2, wherein, when the amplitude of said image signal is decreased upon the acceptance of the input for selecting said third electric power by said switching input section, a same brightness is set as that in selecting the third electric power.

4. The projector according to claim 2, wherein a time of decreasing an amplitude of said image is shorter than said fixed time.

5. A method of switching electric power of a light source, said method being performed in a projector for projecting an image displayed by an image signal, said projector including said light source for generating said image, said light source being supplied with any of first to third electric powers whose electric power value becomes smaller in an order of the first to third electric powers, said light source having a luminance that becomes brighter as a supplied electric power value becomes larger, and a switching input section that accepts an input for selecting any of said first to third electric powers, the method comprising:
 after acceptance of an input for selecting the first electric power or the second electric power by said switching input section, then upon acceptance of an input for selecting said third electric power by said switching input section, when said second electric power has been supplied to said light source for a fixed time, causing said third electric power to be supplied to said light source, and, when said second electric power is not supplied to said light source for the fixed time causing said second electric power to be supplied to said light source and decreasing an amplitude of said image signal and after an elapse of a fixed time causing said third electric power to be supplied to said light source,
 wherein, after the acceptance of the input for selecting the second electric, power by said switching input section, then upon the acceptance of the for selecting said third electric power by said switching input section, when said second electric power has been supplied to said light source for the fixed time, causes said third electric power to be supplied to said light source, and, when said second electric power is not supplied to said light source for the fixed time, causing said second electric power to be supplied to said light source and decreasing the amplitude of said image signal, and after the elapse of the fixed time, causing said third electric power to be supplied to said light source.

6. The projector according to claim 1, wherein, in said image, the luminance becomes brighter as the supplied electric power value to the light source becomes larger.

7. The projector according to claim 1, wherein a timing of a change in a power of the light source and a timing of a change in the amplitude of said image signal are different.

8. The projector according to claim 1, wherein a timing of a change in a power of the light source and a timing of a change in the amplitude of said image signal are unsynchronized.

9. The projector according to claim 1, wherein the controller causes switching from a state of a rated electric power (ECO OFF) to a state of a saving electric power.

10. The projector according to claim 9, wherein the state of the rated electric power is at the first electric power and the state of the saving electric power is at the third electric power.

11. The method according to claim 5, wherein, in said image, the luminance becomes brighter as the supplied electric power value to the light source becomes larger.

12. The method according to claim 5, wherein a timing of a change in a power of the light source and a timing of a change in the amplitude of said image signal are different.

13. The method according to claim 5, wherein a timing of a change in a power of the light source and a timing of a change in the amplitude of said image signal are unsynchronized.

14. The method according to claim 5, wherein the controller causes switching from a state of a rated electric power (ECO OFF) to a state of a saving electric power.

15. The method according to claim 14, wherein the state of the rated electric power is at the first electric power and the state of the saving electric power is at the third electric power.

* * * * *